United States Patent [19]

Chombard et al.

[11] 4,355,540

[45] Oct. 26, 1982

[54] CENTRIFUGAL BRAKE FOR A GYROSCOPE WITH CARDAN SUSPENSION

[75] Inventors: Pierre A. Chombard, Boulogne; Daniel Darni, Villeneuve St Georges, both of France

[73] Assignee: Societe Francaise d'Equipements pour la Navigation Arrienne, Velizy Villacoublay, France

[21] Appl. No.: 165,942

[22] Filed: Jul. 3, 1980

[30] Foreign Application Priority Data

Jul. 4, 1979 [FR] France .............................. 79 17319

[51] Int. Cl.³ ............................................. G01C 19/26
[52] U.S. Cl. ...................................... 74/5.1; 74/5.5; 188/185
[58] Field of Search .................... 192/103 B, 105 CD; 188/185; 74/5 R, 5.1, 5.44, 5.5

[56] References Cited

U.S. PATENT DOCUMENTS

| 2,996,921 | 8/1961 | Hirsch | 188/185 |
| 3,082,335 | 3/1963 | De Lancey | 192/105 CD |

FOREIGN PATENT DOCUMENTS 1403736  5/1965  France .

Primary Examiner—Rodney H. Bonck
Attorney, Agent, or Firm—Browdy and Neimark

[57] ABSTRACT

A centrifugal brake for a gyroscope with Cardan suspension in a fixed housing on a mobile support includes two weights, identical, of C shape, mounted in opposition on two, diametrically opposed cylindrical articulation pins or axles. The two weights form, by their construction, a ring in two identical parts permanently bearing on one another under the action of a spring. The weights are freely articulated, forming by simple construction an autocompensated brake against the inertial forces generated by combined accelerations of the support.

3 Claims, 3 Drawing Figures

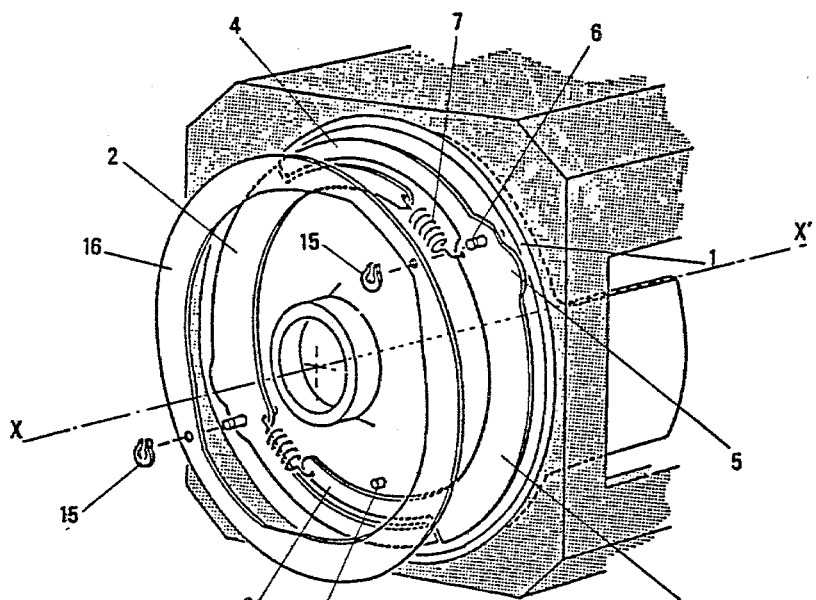
FIG. 1
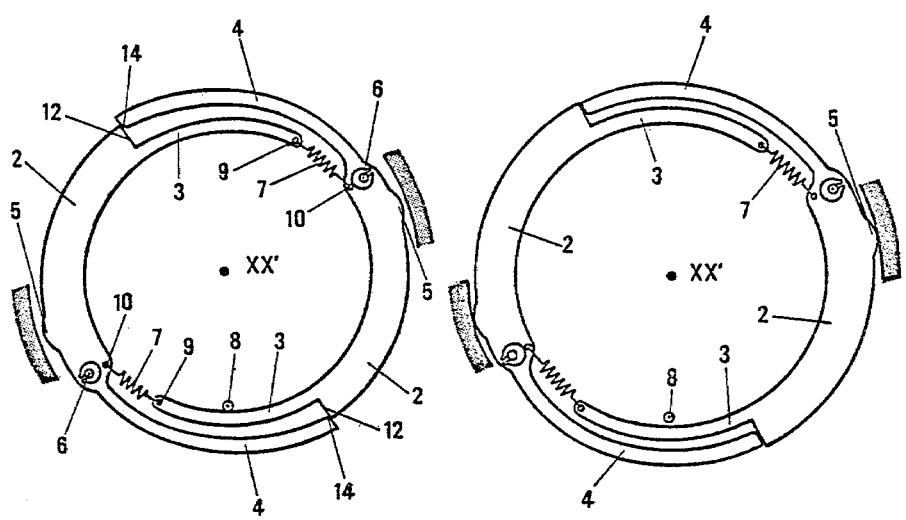
FIG. 2
FIG. 3

CENTRIFUGAL BRAKE FOR A GYROSCOPE WITH CARDAN SUSPENSION

BACKGROUND OF THE INVENTION

The present invention relates to an improvement to a centrifugal brake for gyroscopes with Cardan suspension and, in particular, but not restrictively, to gyroscopic horizons and directional gyroscopes serving to indicate the position of an aircraft around its roll axis, pitch axis and heading axis.

It is known that when the rotor of a gyroscope turns at its working speed, the motor torque which ensures its rotation is equal to the resistance torque due to the bearings and air resistance. The gyroscope then possesses remarkable properties which justify its use; in particular the rotor maintains a fixed orientation in space. If the motor torque should drop or disappear, either by accident through a current failure or by design when one wishes to stop the instrument, the rotor continues to turn by its inertia while decelerating under the effect of the resisting couple indicated above. If the axis of the rotor is not perpendicular to the external axis of the Cardan suspension, this resisting couple has a component along the line of the external axis of the suspension of which the action on the rotor is shown by a precession, ie. by a rotation round the external axis of the suspension which tends to bring the axis of the rotor closer to the external axis of the suspension. This movement builds up in the sense of the initial deviation, it is very slow at first but its speed increases. Given the existence of frictional couples around the axes of the suspension, this movement does not start in practice unless the axis of the rotor deviates sufficiently from the perpendicular to the external axis of the suspension. When this occurs the axis of the rotor can align itself with the external axis of the suspension unless a stop generally provided on the inner ring of the suspension first stops this movement by coming into contact with the outer ring of the suspension. In either case the movement of precession stops and another phenomenon occurs: the rotor, assuming that it is still rotating, tends to entrain the whole of the gyroscope apparatus in rotation about its external suspension axis with accelerating speed. This results in centrifugal forces which can cause damage to the instrument.

There are known devices for preventing these unfortunate effects. They consist essentially in causing, when the current supply to the instrument is cut off, on purpose or not, the appearance of a stop or brake which limits the rotation about the external axis of the suspension. These devices have the disadvantage of restricting the possibility of controlling the evolutions of the vehicle by the gyroscope, although the latter, continuing to turn by its inertia, could still be used for a fairly long time, for example in gyroscopic horizons with mechanical erectors with balls or pendulums.

A centrifugal brake for gyroscopes with Cardan suspension which on the one hand overcomes this disadvantage of blocking or braking the outer ring of the suspension when the current supply to the gyroscope is interrupted while the gyroscope is turning at a sufficient speed to allow control of the evolutions of the support of the gyroscope, and in which on the other hand the braking action is independent of the combined acceleration generated in the support of the gyroscope in the course of the evolutions which this latter is intended to control, the centrifugal brake working equally well in the case where a stop is provided to limit the relative displacement of the two suspension rings and in the case where such a stop is not provided, has been described in the French Pat. No. 1,403,736 of M. Pierre CHOMBARD.

The present invention comprises a centrifugal brake for a gyroscope with Cardan suspension, comprising at least two weights equally spaced on one face of the outer suspension ring along a circumference of which the center is on the external axis of the suspension, each of these being joined to the outer ring of the suspension and movable in a plane perpendicular to the external axis of the suspension in such manner that they can come into rubbing contact with an internal cylindrical part of the housing and thus exert a braking action on the combined rotation of the gyroscope and its suspension about the external axis of the latter;

at least one return spring connected to the weights;

at least one stop limiting the travel of the weights towards the inside of the housing;

and a compensating device between the weights so that the inertial forces which may be generated by the combined acceleration of the support in the course of its own evolutions, evolutions which the gyroscope is intended to control, annul each other.

All the weights are held in the position of rest by a stop or stops so long as the tension exerted by the spring or springs on the weights is greated than the centrifugal forces which are generated by the rotation of the outer ring of the suspension about the external axis of the latter. The weight exert a braking action on the said rotation as soon as its angular velocity exceeds an adjustable predetermined value.

SUMMARY OF THE INVENTION

The object of the present invention is to provide a centrifugal brake of the type in the French Pat. No. 1,403,736 in order to achieve substantially the same result by using a different, technically simplified and unobvious design.

According to the present invention, the structure and the mounting of weights are modified so that two identical weights of C form are mounted in opposition in such a way as to articulate about two axles disposed symmetrically in relation to the external axis of the suspension of the gyroscopic instrument, and connected together by permanent contact of the one on the other, which has the effect of ensuring their conjugated movement without the need for the intervention of an intermediate part.

In fact, the centrifugal brake, according to the present invention, comprises only two identical weights which articulate in relation to each other without an intermediate connecting piece. This centrifugal brake has the advantage of much greater simplicity of construction.

The omission of the intermediate connecting piece and the simplification of construction of the assembly has an industrial result which finds its application in all gyroscopes with Cardan suspension.

BRIEF DESCRIPTION OF THE DRAWINGS

The characteristics and advantages of the invention will appear in the description which follows, with reference to the attached drawings, given as non-restrictive examples.

FIG. 1 is a perspective view of the brake system according to the present invention.

FIGS. 2 and 3 are front views of the brake system referred to above, respectively in the position of rest (FIG. 2) and in the working position (FIG. 3).

DETAILED DESCRIPTION OF A PREFERRED EMBODIMENT

The figures show an outer ring 1, partly represented, which supports the centrifugal brake. This centrifugal brake consists of two weights 2 each, in the form of a C, strictly identical, placed in opposition, each articulated on a respective hinge pin or cylindrical axls 6, solid with the ring 1, forming axes articulation. The C-shaped weights 2 each have three distinct portions, a central portion constituting a body which is extended at one end by a lower lip and at the other by an upper lip, these lips being the second and third distinct portions.

By their design the weights 2 are in permanent contact and constitute a perfectly symmetrical, articulate circular assembly with conjugated displacement; that is, the displacement of one necessarily involves displacement of the other.

It can be seen that the body of the respective weights 2 presents a shoulder 12 with which an end 14 of the upper lip of the opposed weight is in permanent contact while the lower lip of the first weight extends below the upper lip of the second weight.

In addition, a respective raised portion 5 provided on each weight 2 is intended to bear with friction on a fixed frame of the instrument due to the angular displacement of the weights 2 under the effect of rotation about the external axis XX' of the gyroscopic equipment.

At least one return spring 7 joins the body of the one of the weights 2 to the end of the lower lip of the weight mounted in opposition.

The initial tension of the spring 7 determines the angular velocity at which the raised portions 5 come into contact with the frame, producing a frictional moment intended to limit the velocity of rotation of the gyroscopic instrument.

This limit velocity is reached when the frictional moment, proportional to the centrifugal force exerted on the weights 2, is equal to the driving moment.

A single internal stop 8 supports the system in the position of rest. Holes 9 and 10 form anchor points of the ends of the spring 7.

The result of this assembly is that the angular displacement of one of the weights 2 necessarily involves the other weight in an equivalent angular displacement by mutual sliding resulting from the symmetrical disposition of the hinge pins or axles 6 of the weights 2 in relation to the aforesaid axis XX'.

FIGS. 2 and 3 illustrate the mode of action of the brake system showing respectively the system in the position of rest and in the working position.

The conjugation of the movement of the weights 2 makes this assembly sensitive only to the centrifugal accelerations about the axis XX', allowing complete freedom of the gyroscopic instrument to respond to the various accelerations encountered in flight.

FIG. 1 shows in perspective additionally a flange 16. The flange 16 serves simply to keep the weights 2 in their plane. Arcuate clips 15 keep the flange in position on the pins 6.

We claim:

1. A centrifugal brake for a gyroscope with Cardan suspension mounted in a housing fixed to a mobile support, said suspension having an outer ring which rotates about an external axis of the suspension, said brake comprising two identical weights mounted on one face of said outer ring, said weights being articulated on two diametrically opposed axes with respect to and parallel with said external axis of the suspension, each of said weights comprising a raised portion adapted to rub on a fixed part of said housing to thus exert a braking action on the assembly of the gyroscope and its suspension about said external axis, at least one return spring means interconnecting said weights, at least one stop limiting travel of said weights towards said external axis, said two weights comprising two inertial elements each of substantially "C" shape; each of said elements including a central portion and two end portions thinner measured radially than said central portion; one of said end portions on each of said weights comprising, with respect to said external axis, an outer end portion and the other of said end portions comprising an inner end portion; said at least one return spring means being fixed at one end to said central portion of one of said elements and at its other end to said radially inner end portion of the other of said elements; each of said elements being formed with a shoulder at the junction of its central portion and the radially inner end portion, and said shoulder of each element being in contact with said outer end portion of the companion element under the urging of said spring means.

2. The brake of claim 1, said spring means comprising a pair of tension springs each trained between an opening in the free end of the radially inner end portion of one of said weights to an opening formed at said junction at the other of said weights.

3. The brake of claim 1, and keeper flange means, said weights being pivotally mounted on respective pins defining said axes spaced from and parallel to said external axis, and means to mount said keeper flange means on said pins outwardly of said weights thereon.

* * * * *